Patented Feb. 13, 1940

2,190,445

UNITED STATES PATENT OFFICE 2,190,445

REGENERATED CELLULOSE ETHER PRODUCT

Deane C. Ellsworth, deceased, late of Wilmington, Del., by Joseph F. Haskins, administrator, Wilmington, Del., assignor to E. I. du Pont de Nemours & Company, Wilmington, Del., a corporation of Delaware No Drawing. Original application July 25, 1933, Serial No. 682,119. Divided and this application January 29, 1936, Serial No. 61,337

5 Claims. (Cl. 106—40)

This invention relates to cellulose and more particularly to cellulose glycolic acids, that is, cellulose ethers in which cellulose hydroxyl hydrogen atoms have been replaced by glycolic acid residues, radicals, nuclei or groups.

Compounds which are presumably cellulose glycolic acids have been mentioned in the literature. British Patent 138,116 refers to the production of gelatin substitutes by treating alkali cellulose with chloro-acetic acid. The patent states that the products obtained (in the form of their alkali salts) are soluble in hot and cold water. United States of America Patent 1,682,294 also refers to the treatment of alkali cellulose with chloro-acetic acid and states that substances insoluble in water are produced. These substances are soluble in aqueous alkalies at ordinary temperatures.

For convenience of consideration the cellulose glycolic acids of the prior art may be divided into three groups as follows:

A. Ethers soluble in organic solvents.
B. Ethers soluble in water and whose sodium salt is soluble in water.
C. Ethers soluble in alkali in excess of the amount required to stochiometrically combine with the carboxyl groups of the ether.

These cellulose glycolic acid ethers differ primarily in the amount of etherification of the cellulose molecule which has taken place. The glycolic acid radical content of group A is quite high, that of group B being much less than group A and that of group C being still less than group B. The degree of substitution alone is insufficient to fix the properties of the ethers, it having been found that there is a considerable zone common to adjoining classes wherein an ether of a particular amount of substitution may be found in either of the two groups. A second important factor is responsible for the variation in solubility of ethers of the same amount of substitution. This factor is the state of degradation (depolymerization) of the cellulose ether. It is even more important in effecting the usefulness of the cellulose derivative than the first factor mentioned. The degradation of the cellulose nucleus depends upon the source of the cellulose and the treatment which it receives before, during and after etherification. Cellulose glycolic acids in which the cellulose aggregates are broken down (degraded) are always of poorer strength and lower degree of elasticity than those that retain to a higher degree the state of polymerization of the native cellulose.

This invention has for an object the preparation of new glycolic acid derivatives of cellulose. Other objects are the preparation of new glycolic acid derivatives of cellulose by reacting cellulose with an alkali metal salt of a halo-acetic acid to produce derivatives which preferably retain to a high degree the state of polymerization of the native cellulose, to prepare new glycolic acid derivatives of cellulose that are readily dissolved in dilute caustic by the mechanism of the step of chilling, almost freezing, or freezing a mixture of the components of the final solution, to prepare useful articles from these new cellulose glycolic acid derivatives, for example, films, threads, molded articles, sized fabrics, sized paper and the like and to improve the usefulness of some of these prepared articles by applying to them a moisture-proof coating. Still further objects are to devise new chemical and/or physical processes, to produce new chemical and/or physical compounds, to prepare valuable cellulose derivatives in a very desirable physical form and in a high degree of purity. A general advance in the art and other objects which will appear hereinafter are also contemplated.

The foregoing objects and related ends are accomplished in the manner set out in the following description in which details of what is believed the best mode for carrying out the invention are disclosed.

Briefly, the process consists of treating cellulose in the presence of caustic alkali with the etherifying agent, that is, a derivative of a halogen substituted acetic acid (halo-acetic acid), in such proportions and under such conditions that there results a cellulose glycolic acid of low degree of substitution, which preferably retains a high degree of polymerization and which is insoluble or only imperfectly soluble in dilute aqueous solutions or alkali at ordinary temperatures but soluble in such solutions at low temperatures. In its preferred form, the process consists of treating cellulose with caustic alkali solution and subjecting the resulting alkali cellulose to direct contact with the etherifying agent, that is, a salt of chlor-acetic acid in such proportions that there results a new cellulose glycolic acid which is insoluble or only imperfectly soluble in dilute aqueous solutions of alkali at ordinary or room temperatures (about 20°–30° C.) but which dissolves in such solutions when cooled to low temperatures. The new derivatives are readily put into solution through the mechanism of the step of chilling, almost freezing, or freezing the solution during the preparation thereof, which solution may thereafter be put into the form of useful products and coagulated in that form.

The invention will be further understood by a consideration of the following detailed description and illustrative specific examples in which the quantities, unless otherwise indicated, are given in parts by weight.

*Example I*

In an excess of 20% sodium hydroxide solution, one molar weight (162 parts) of oven dried cellulose (spruce sulfite pulp) in the form of sheets is steeped for 2 hours at 28° C. This is pressed out until its weight is three times that of the starting cellulose. The sheets are shredded or torn to crumbs in a shredder of suitable type at a temperature not exceeding 25° C. for 2 hours. The alkali cellulose so prepared is allowed to age or ripen in a covered can for 24 hours at 28° C. before reacting upon it with a solution of 0.6 mol (70 parts) of sodium chloro-acetate in a little water. Such a solution is conveniently prepared by dissolving 56.5 parts of chloro-acetic acid in 61 parts of water and neutralizing this with 50 parts of sodium bicarbonate. The reaction can best be carried out in an apparatus of the mixer or shredder type, equipped with a means for circulating warm and cold water through the jacket of the mixer. The sodium chloro-acetate solution is kneaded in, and then the shredder is sealed air-tight and the contents are warmed to 40°–42° C., at which tmperature reaction is maintained for 20 hours.

The product, which resembles the original alkali cellulose in appearance and contains approximately 0.1 to .2 glycolic acid residues per glucose unit, is dispersed in 1836 parts of 6% NaOH, in which at room temperature it makes only an imperfect (fibrous) dispersion but which dipersion, after being cooled to —6° to —10° C. and being again warmed to room temperature, is a clear and transparent, colorless or pale straw colored solution of moderate viscosity similar to that of spinning viscose. It is fibre-free but should be filtered to remove any extraneous matter if its application is to be in preparation of threads or films. This solution, after freezing, is stable at 30°–35° C. for 3 weeks or more without jelling or undergoing any appreciable change in clarity or in viscosity.

For films the solution is evenly spread upon glass plates to a depth of about 0.1″. These are immersed in a coagulating bath (7%

$(NH_4)_2SO_4 + 5\% \ H_2SO_4$ is very suitable) for a period sufficient to ensure thorough coagulation. This is very rapid and 5 minutes is adequate, while much shorter times can safely be used in most cases. The film is removed from its supporting plate and washed acid free. In this stage it may be quite weak and must be handled carefully. It may be softened, using a softener bath, such as glycerine or glycol in aqueous solution. Since the derivative is more readily softened by a small amount of glycerine than is a regenerated cellulose film, a softener bath of not more than 2% glycerine is adequate. The film may then be spread out upon a glass plate and dried at 65° C. for about 20 minutes and then stripped from the plate.

The finished film is strong, flexible, and soft. The elasticity is surprising. The clarity and luster are unexcelled by that of any regenerated cellulose film. Although when first cast the film is weak and tender, on wetting out after drying it has very good wet strength, quite as high as that of similar cellulose films.

If the film, made as above, is washed free of glycerine and analyzed, it will be found to contain 6.7% $OCH_2COOH$ on the dry basis. This corresponds to one —$.CH_2COOH$ group per 6.7 $C_6H_{10}O_5$ groups.

*Example II*

The films prepared as in Example I are coated with a compositon comprising a synthetic resin and a wax, preferably with the addition of a plasticizer. This can be accomplished according to the teachings of the copending application Serial No. 461,840, filed June 17, 1930, by William Hade Charch, by using for example:

| | Parts by weight |
|---|---|
| Polymerization products resulting from 60% vinyl chloride and 40% vinyl acetate | 15 |
| Tricresyl phosphate | 7 |
| Refined paraffin | 3 |

These components are dissolved in 100 to 200 parts of toluene, and the film is coated in any suitable manner such as by immersion. After the excess coating has been removed the solvents are evaporated at an elevated temperature, whereupon a film is produced having at least the same transparency and flexibility of the original base sheet but having in addition the ability to resist penetration of moisture or water vapors.

*Example III*

The solution of cellulose glycolic acid of spinning viscosity is prepared as in Example I. This solution is forced through a spinneret containing orifices of about 0.0035 inch diameter, into a coagulating bath consisting of 10% $H_2SO_4$ and 15% $Na_2SO_4$; the filaments that form immediately are combined and the resulting thread is passed over guides in such a way that tension is applied to the thread while it is in the gelled state, and collected upon a bobbin at a speed substantially greater than the jet velocity of the solution at the orifice. It is subsequently washed free from acid, bleached if desired, and dried. As compared with threads regenerated from viscose these require much less bleaching while dyeings with basic dyes reveal substantially increased affinity.

*Example IV*

Textile materials, such as cotton cloth, are dipped into the solution prepared in Example I, then into a bath of 10% sulfuric acid. After a few minutes in this bath, the cloth is removed, washed acid free and dried. It is found to be markedly stiffened and fulled to an extent considerably greater than any treatment with equivalent alkali and acid solutions would impart. This sizing, distinct from starch sizing, is relatively permanent to laundering.

*Example V*

One hundred sixty-two parts of oven dry sulfite cellulose pulp boards are steeped in 20% NaOH for 1 hour at 20° C. The pulp boards are removed, pressed to 486 parts by weight, and shredded in a suitable macerating machine for 2 hours at a temperature of 20°–22° C. The crumbs of alkali cellulose are aged at 23°–25° C. for 48 hours. The alkali cellulose is then put back into the shredder where a solution of ½ molar part (58.25 parts by weight) of sodium chlor-acetate in 63 parts of water is added. With continuous mixing the reaction is allowed to proceed for 22 hours at a temperature of 42° C. in the closed kneading machine.

The product containing .1 to .2 glycolic acid residues per glucose unit, is dispersed in 2200 parts by weight of 6% NaOH. The fibrous dispersion is cooled by brine to −12° C. and is then warmed again to room temperature; following this step it is a clear, pale straw colored solution, substantially fiber-free, and of medium viscosity. It may be filtered if desired. This solution is very suitable for coagulation in the form of films or filaments.

Example VI

Eighty-one grams (½ mol) oven dry wood pulp treated with 20% NaOH for 1 hour, are pressed to 243 grams and shredded for 2 hours, all at room temperature. This alkali cellulose is aged 24 hours at 20° C. and then caused to react with a solution of ⅛ mol (14.6 grs.) of sodium chloro-acetate in 1 mol (18 grs.) $H_2O$. The reaction is carried out in the shredder at 40° C. over a period of 18 hours. The product containing approximately .075 to 0.15 —$OCH_2$—$CO_2H$ groups per glucose unit, is dispersed in 918 grs. of 6% NaOH. At room temperature there is formed a very incomplete and fibrous dispersion but after freezing at −12° to −14° C. the solution is almost perfect. It may be necessary to filter out a slight residue of insoluble or resistant fibers, but the solution is clear, transparent, very light straw in color, and of high viscosity. As long as this solution is kept below 15°–16° C. it retains its fluidity, may readily be filtered and extruded through suitable nozzles for filaments, or spread upon plates to form films. These films are especially strong, being equivalent to regenerated cellulose films on counts of strength, flexibility, clarity, luster, transparency, extensibility and elasticity.

At higher temperatures this solution sets to a jelly very firm and elastic. In this state little can be done with it. Cooling below 10°–15° C., however, returns it to its fluid and useful state.

Example VII

One hundred sixty-two parts of high alpha content cotton linter cellulose are steeped for an hour at 20° C. in 20% sodium hydroxide solution. The alkali cellulose is then removed, pressed to three times its original weight and put into a shredder through the jacket of which is circulating water at 18° C. The alkali cellulose is shredded for a sufficient period to give thorough comminution and without any further aging it is caused to react with a solution of 58.25 parts (0.5 mol) of sodium chloro-acetate in 63 parts of water. This is mixed in over a period of thirty minutes, after which the shredder is made air-tight and the temperature raised to 38° C., at which the reaction mixture is maintained for 20 hours.

The product, containing 0.1 to 0.2 glycolic acid residues per glucose unit and resembling the original alkali cellulose, is dispersed in enough 6% NaOH solution to make a 5% concentration based on the starting cellulose. After stirring at room temperature the dispersion is full of gelled particles and fibers, and is useless. It is cooled to −10° C. at which temperature it is full of ice crystals and would freeze solid if stirring were stopped. The solution is raised to 20° C. at which it remains fluid but very viscous, of beautiful clarity and water-white color. Filtration is required to remove a certain small residue of resistant fibers and other extraneous matter. The filtered solution is stable indefinitely at 20° C. From it films of exceptional strength and brilliance can be produced by the method of Example I.

This solution, when heated above 25° C. sets to a solid jelly which is rigid and elastic. By again cooling below 20° C. the fluidity is returned, the solution being then as useful as ever for the production of threads, films, etc.

Example VIII

One hundred and sixty-two (162) parts of air-dry sulfite pulp were steeped for one hour at 20° C. in 2000 parts of 18% sodium hydroxide solution. The resulting alkali cellulose was pressed to 400 parts and then disintegrated for one hour at 25° C. in a shredder. Fifty-nine (59) parts of dry sodium chloro-acetate were added and the shredding continued for six hours at 20° C. The reaction mixture was then removed from the shredder, placed in storage containers and allowed to age for twenty-four hours at 25° C. This aging completes the reaction and reduces viscosity. The aged product was then drowned in 1% sulfuric acid after which it was washed acid-free and dried. The dried product, while very closely resembling cellulose, feels somewhat harsher. A 7% slurry of this product in 7% caustic soda solution is sticky and extremely fibrous at 25° C. The same slurry when cooled to −6° C. forms a very fine viscous solution which, upon being warmed to 25° C., is perfectly stable. The solution can be cast to films or other shaped materials in the same way as the products described above.

As an alternative procedure the reaction product can be dissolved directly after the aging step. Such a solution as results however, is not as satisfactory as that made from the purified (washed) product and the solution exhibits a tendency to gel.

Example IX

One hundred and sixty-two (162) parts of air-dry sulfite pulp were steeped for one hour at 20° C. in 2000 parts of 30% sodium hydroxide solution. The resulting alkali cellulose was pressed to 486 parts and then disintegrated for one hour at 25° C. in a shredder. Fifty-nine (59) parts of dry sodium chloro-acetate were added and the shredding continued for six hours at 20° C. The reaction mixture was then removed from the shredder, placed in storage containers and allowed to age for twenty-four hours at 25° C. This aging completes the reaction and reduces viscosity. The aged product was then drowned in 1% sulfuric acid after which it was washed acid-free and dried. The dried product, while very closely resembling cellulose, feels somewhat harsher. A 7% slurry of this product in 7% caustic soda solution is sticky and extremely fibrous at 25° C. The same slurry when cooled to −6° forms a very fine viscous solution which, upon being warmed to 25° C. is perfectly stable. The solution can be cast to films or other shaped materials in the same way as the products described above.

As an alternative procedure the reaction product can be dissolved directly after the aging step. Such a solution as results however, is not as satisfactory as that made from the purified (washed) product and the solution exhibits a tendency to gel.

The product obtained by the process of this example is useful for many purposes but is not as soluble as the product produced according to Example VIII.

*Example X*

One hundred and sixty-two (162) parts of air-dry sulfite pulp were steeped for one hour at 20° C. in 2000 parts of 18% sodium hydroxide solution. The resulting alkali cellulose was pressed to 400 parts and then disintegrated for one hour at 25° C. in a shredder. Fifteen (15) parts of dry sodium chloro-acetate were added and the shredding continued for six hours at 20° C. The reaction mixture was then removed from the shredder, placed in storage containers and allowed to age for seventy-two hours at 25° C. This aging completes the reaction and reduces viscosity. The aged product was then drowned in 1% sulfuric acid after which it was washed acid-free and dried. The dried product, while very closely resembling cellulose, feels somewhat harsher. After the purification by drowning in sulfuric acid and washing, there results a cellulose glycolic acid which is insoluble in 8% caustic soda solution at 25° C. The product is soluble in such a solution when cooled to −8° C. giving a viscous filterable solution. This product is especially useful as a paper size.

*Example XI*

One hundred and sixty-two (162) parts of air-dry sulfite pulp were steeped for one hour at 20° C. in 2000 parts of 18% sodium hydroxide solution. The resulting alkali cellulose was pressed to 400 parts and then disintegrated for one hour at 25° C. in a shredder. Eight (8) parts of dry sodium chloro-acetate were added and the shredding continued for six hours at 20° C. The reaction mixture was then removed from the shredder, placed in storage containers and allowed to age for four days at 25° C. The purified product is insoluble in an 8% aqueous caustic soda solution at 25° C. but on cooling to −10° C. a filterable, viscous solution results. This solution gelled after standing at room temperature for about one week. Solutions of this product are extremely hazy, whereas those made from ethers of higher degrees of substitution are quite clear. However, films cast from solutions of material obtained according to the above procedure are quite clear but have a tendency to be brittle.

*Example XII*

One hundred sixty-two (162) parts of high viscosity cotton linter pulp were steeped in 2000 parts of a 25% sodium hydroxide solution. The alkali cellulose obtained was pressed to 486 parts and thereafter shredded for one-half hour at 20° C. The shredder was then cooled to 15° C. and 178 parts of solid sodium chloro-acetate added. The shredding was then continued for eight hours at 15° C., after which the product was removed from the shredder and stored for ten hours at 25° C. for the purpose of completing the reaction. The cellulose glycolic acid obtained was purified by acidification followed by washing. After the excess acid had been removed by this washing the product was dried. The resulting ether was of extremely high viscosity. A 5% mixture in 10% caustic soda is a sticky mass at 25° C. but on cooling dissolves to give a very high viscosity almost fiber-free ether. Films and filaments made from this product are unusually strong and flexible. Analysis shows the product to contain 0.6 glycol acid radicals per glucose unit of cellulose.

*Example XIII*

One hundred sixty-two (162) parts of high viscosity unbleached cotton linters were steeped in 2000 parts of a 25% sodium hydroxide solution. The alkali cellulose obtained was pressed to 486 parts and thereafter shredded for one-half hour at 20° C. The shredder was then cooled to 15° C. and 356 parts of solid sodium chloro-acetate added. The shredding was then continued for four hours at 25° C. after which the reaction product was removed from the shredder and purified immediately. The product obtained is insoluble in 6% sodium hydroxide at room temperature but dissolves to form a very viscous solution at −5° C. This cellulose ether contains .75 glycolic acid radical per glucose unit.

When this general process is followed utilizing a twelve hour reaction period instead of a four hour reaction period, there is obtained a cellulose glycolic acid soluble in 6% sodium hydroxide solution at room temperature.

*Example XIV*

A bleached sulfite pulp was charged to a beater and the charge beaten until the pulp had a slowness comparable to a good grade of bond paper pulp. To every 100 parts of fibre was added 200 parts of a 2% solution in 4% sodium hydroxide of the product of Example IX. Dilute sulfuric acid was then added to a pH of 4.5. The pulp was discharged from the beater, diluted to paper making consistency, formed into sheets and the sheets subsequently pressed and dried at approximately 100° C. The sheets were of good wet strength, excellent color, had good writing and printing properties and fair water-resistance as determined by the dry indicator test.

As starting materials for the preparation of the low-substituted cellulose glycolic acids of this invention, cellulose in most of the forms in which it occurs may be utilized. Cellulose in woven or spun form is unsuited for the reaction, not only because of economic disadvantages but because the high molecular weight and the compact and tightly twisted form of this type of materials renders it virtually impossible to bring about more than surface etherification with the result that such products upon treatment according to the process of the invention give fibers which consist of a core or areas of cellulose or slightly etherified cellulose surrounded by more highly etherified cellulose. Even under the most favorable conditions such products can hardly be called soluble.

Since products of great solubility are of a high degree of uniformity and are of a solubility which permits filtration without considerable loss of material, it is preferred to use cellulose as loose fibers or in pulp or board form. This type of cellulose is distinguished from cellulose which has been fabricated into yarn and woven goods by the term "chemical cellulose". Short fiber cellulose such as cotton linters or wood pulp is especially suitable because of the ease with which the reagent can be mixed therewith in an apparatus such as a shredder. These materials give ethers of good uniformity, capable of forming solutions which can be filtered. Solutions from the less easily handled forms of cellulose in contrast therewith cannot be filtered.

Above all, it is preferred to use purified lignocellulose, particularly purified wood cellulose for the preparation of the cellulose glycolic acids of this invention. With such source materials there can be obtained cold alkali soluble products of a very superior solubility. Because of some apparently inherent property in this type of cellulose, it is possible to obtain soluble products with markedly lower quantities of reagent and accordingly with lower degrees of substitution than are needed with cellulose derived from cotton. This is exceedingly important, not only because of the saving in reagent but because the regenerated product is of a decidedly higher wet strength the product is much easier to handle.

A critical difference in filtration characteristics also exists between the derivatives made from the two types of cellulose. Thus, in etherifying cotton it has been found that with the minimum quantity of reagent necessary to give a cellulose glycolic acid of a solubility suitable for filtration using purified wood cellulose that the resulting cotton cellulose glycol acid cannot be filtered at all through cotton batting even though the degree of etherification is substantially the same. Such comparisons are, of course, made with products of the same intrinsic viscosity in the same concentration of alkali. The cellulose source material may advantageously be dry but need not be bone dry. Air-dried cellulose may be satisfactorily used.

It has been found that in order to obtain these new derivatives of suitable solubility in cold dilute alkali solution, it is essential to coordinate two factors, namely, the degree of degradation of the cellulose and the degree of etherification. To obtain solubility at desirable concentrations and viscosities of the solution for purposes such as the preparation of filaments, a slight degradation of the cellulose is usually necessary but should not be very drastic. For some purposes, the degradation effected may be so slight as to leave the cellulose in a substantially undegraded condition. In general, however, degradation is necessary and should be regulated in accordance with the nature of the product which it is desired to make.

With undegraded celluloses such as native celluloses, comparatively high degrees of substitution are necessary to achieve solubility. In some instances one glycolic acid group per $C_6$ unit of the cellulose may be necessary for this purpose. As the cellulose is degraded lower degrees of substitution are needed to achieve solubility. Where the cellulose molecule has suffered considerable degradation, extremely low degrees of substitution and accordingly, only very small quantities of etherifying agent are necessary to achieve cold caustic solubility. Although the invention is properly limited by the solubility of the resulting product and not by the degree of substitution, it has been found that in general, useful products are not obtained at degrees of substitution of less than 0.03 mol per glucose unit. On the other hand, products containing as much as one glycolic acid group per glucose unit of the cellulose tend to become soluble in alkali at room temperature unless the cellulose is virtually undegraded. Products of greatest utility contain from about 0.1 to 0.4 glycolic acid groups per glucose unit of the cellulose. For the preparation of films and filaments where the high strength of the freshly precipitated films or filaments in the regenerated bath is important, it is desirable to hold the degree of substitution to less than 0.3 mol per glucose unit of the cellulose.

The concentration of the sodium hydroxide used in the steeping solution has an important bearing on the solubility of the resulting cellulose glycolic acid. Products of best solubility are obtained when the concentration of the steeping liquor is greater than 12 per cent and less than 25 per cent. Soluble products are obtained in concentrations greater than 25 per cent but solutions contain more insoluble fiber than those prepared from products made with 12–25 per cent caustic. Ethers made with less than 12 per cent caustic are insoluble or of poor solubility unless the cellulose molecule has been degraded considerably.

The most satisfactory temperature of reaction is 20° to 25° to 30° C. Higher temperatures give less efficient utilization of chloro-acetic acid and consequently products made in this way are of poorer solubility than those made at room temperature. At low temperatures the reaction is slow.

The cellulose can be degraded by any of the usual methods. Degradation may take place before formation of the alkali cellulose. The aging of the cellulose in the presence of alkali may be effected before the reaction or afterwards. In general, it is preferable to age after the etherification since this avoids the step of shredding and aging the alkali cellulose. If desired, the degradation can take place after the purification of the ether, for example, by treatment of the cellulose glycolic acid with acids or oxidizing agents or other depolymerizing agents.

The degree of substitution required for any product depends on the viscosity of the product. Since most of the physical properties of shaped objects regenerated from cellulose glycolic acid solution depend upon the inherent viscosity of the cellulose glycolic acid, the procedure to be followed in selecting a product for a given use will be to first choose the viscosity which gives a satisfactory product and then determine the degree of substitution necessary to give a product of that viscosity, which does not dissolve in dilute alkali at ordinary room temperature but which dissolves on cooling. In general, it is not desirable to use a much higher degree of substitution than that necessary to give solubility since the higher the degree of substitution, the more water sensitive the resulting product becomes. Water sensitivity is of distinct disadvantage in the manufacture of artificial silk and for textile sizing.

As etherifying agents there can be used any of the mono-halogen acetic acids, their metallic salts, particularly the alkali metal salts or derivatives of the halo-acetic acids such as the amides and esters.

The etherification mixture may be used as such or the cellulose glycolic acid may be isolated if desired. For spinning it is preferable to dissolve the etherification mixture directly in dilute alkali and to adjust the concentration to secure the desired viscosity. The cellulose glycolic acid may be isolated in various ways. For example, the etherification reaction mixture may be washed with a large excess of water, keeping the sodium hydroxide content of the wash water below 1%. The reaction mixture may also be mixed with a large volume of dilute acid and thereafter washed acid-free.

After either of these purification treatments the resulting product can be dried without appreciable deterioration unless the drying is carried on for too long a period. If desired, the wet product may be washed with methanol and thereafter with di-ethyl-ether before drying.

In preparing the solution, caustic soda concentrations of from 5 to 10 per cent are most satisfactory although in some instances lower concentrations can be used. Maximum solubility is obtained with solvent caustic concentration of 9 to 10 per cent but since such high concentrations are uneconomical, 5 to 8 per cent sodium hydroxide is most often used. The temperature to which the mixture must be cooled to effect solution is to some extent dependent on the degree of substitution and the viscosity of the derivative. The lower the degree of substitution, the lower the temperature required to effect complete dispersion. In preparing the solution, temperatures from 5° down to the freezing point and lower are satisfactory. The lower the degree of substitution, the lower the temperature required to effect good dispersion. The solution so obtained can be brought back to room temperature and filtered if desired. It may be used directly for treatment of textiles or paper or in the sizing of paper without filtration. Most solutions made from purified ethers are stable at room temperature indefinitely. Less soluble products as well as those which have not been purified sometimes gel after standing. Products which gel, however, can be reliquefied by chilling.

Sodium hydroxide solutions are best suited for dissolving the cellulose glycolic acid. Sodium hydroxide is not only cheaper than other caustic alkalies but exerts greater solvent action than any of the alkali metal hydroxides, except lithium hydroxide. The high cost of lithium hydroxide together with the difficulty of obtaining it in pure form, however, makes its use impractical at the present time.

The problem of coagulation is very similar to that met with in the case of viscose but it is not complicated by the necessity for regeneration of cellulose. The presence of the salt and water of the coagulating solution is the only contamination encountered. Absence of sulfur compounds diminishes the need for bleaching. In the formation of fibers or threads, considerable variation is possible in the composition of the coagulating bath. Water alone, while not usually satisfactory, may in some cases be used. Solutions of mineral acids such as sulfuric, ranging from low concentrations (3–4%) to 70% or higher, are suitable. Such solutions may with benefit be combined with salt solutions, for example, 5–15% $Na_2SO_4$ or $(NH_4)_2SO_4$ and also with buffers and sugars in accordance with the common practice in the viscose industry. The coagulating baths for films may be varied over a wide range and in general any acid bath is suitable. Combinations of sulfuric acid and sodium sulfate (for example 10% $H_2SO_4$+15% $Na_2SO_4$) give especially good results as do the baths well known in the viscose art.

Coagulating baths having a plasticizing action, particularly those containing more than 35% sulfuric acid are especially suitable in the preparation of filaments.

The product may also be precipitated as an insoluble salt such as the aluminum, silver, iron, tin, copper and lead salts. The insoluble salts may be formed after initial coagulation with other baths if desired. These insoluble derivatives are especially water-resistant.

In the preparation of transparent sheets by processes falling within the scope of this invention, the sheets may be softened by such softeners as glycerol, diethylene glycol or any of the usual softeners for regenerated cellulose sheeting. The amount of softener required is somewhat less than that necessary for regenerated cellulose films. Unsoftened film made according to this invention is more flexible than an unsoftened regenerated cellulose film.

Instead of coagulating the film on a glass plate the solution may be forced continuously through a narrow slit into a coagulating bath and thereafter passed over rolls through suitable baths, etc. in the manner known to the viscose industry. The process of preparing transparent sheets followed in Example I is especially suited to laboratory technique. The method for the formation of threads followed in Example III is not adapted to laboratory technique. Continuous mechanical processes have not been described in this specification because they are well known in the art.

Transparent sheets of the cellulose glycolic acid of this invention may be rendered moistureproof as shown in Example II. The process described in U. S. P. 1,737,187 to Charch and Prindle for the moistureproofing of sheets of regenerated cellulose may be used for the treatment of films prepared in accordance with this invention. A satisfactory composition for this purpose contains 43 parts cellulose nitrate, 23 parts tricresyl phosphate, 7 parts paraffin wax, 27 parts gum dammar and 760 parts of a mixed solvent containing about 3 parts ethyl acetate to 2 parts toluene. The sheets of cellulose glycolic acid are passed through such a composition, the excess lacquer removed from the sheets by means of a squeezing roll and the sheets dried at a point substantially above the melting point of the wax. Moistureproofed sheets so obtained are glass clear, flexible, highly impermeable to the passage of moisture (water vapor) and comparing very favorably in this respect with films of regenerated cellulose moistureproofed with the same composition. When tested by suspension in water the adhesion of the moistureproofed coating on the cellulose glycolic acids was found to be distinctly superior to the adhesion of the same coating composition on a sheet of regenerated cellulose. In the case of the regenerated cellulose, separation of the sheet and the moistureproofed coating occurred in from 1 to 3 hours, whereas in the case of the cellulose glycolic acid (sheet prepared as described in Example I) separation occurred only after 24 hours treatment.

Still another method of waterproofing which may be advantageously used with sheets of the cellulose glycolic acid of this invention is disclosed in the copending application of William R. Straughn, Serial No. 582,488, filed Dec. 21, 1931. A specific coating composition described in that application and consisting of:

| | Parts |
|---|---|
| Candelilla wax | 33 |
| Paraffin (melting point 62° C.) | 16 |
| Zinc resinate | 5 |
| Toluene | 100 to 1000 | gives very satisfactory results. This composition which is a solution, is applied in any convenient manner, the excess solution removed and the solvent evaporated at an elevated temperature. As a result there are obtained films which are glass clear in transparency, flexible and distinctly moistureproof.

These new low-substituted cellulose products of this invention differ from those of the prior art in that they are insoluble or at least imperfectly soluble in dilute aqueous caustic soda at normal temperatures but are dissolved by such alkali solutions when the solutions are chilled to near their freezing points. The processes of this invention differ from those of the prior art in that the etherification is stopped at such a point that the final product can be dissolved in dilute alkali at low temperatures but cannot be substantially dissolved by dilute alkali at ordinary room temperatures. This is accomplished either by limiting the quantity of etherifying agent or by stopping the etherification after the degree of etherification has become sufficiently great that the final product can be dissolved in alkali at low temperatures but before the degree of etherification has become sufficiently great that the final product can be dissolved by alkalies at ordinary room temperatures. The degree of etherification or quantity of reagent necessary to achieve this degree of solubility cannot be specified because it varies with the viscosity of the final product and the nature of the starting cellulose. Thus a cellulose glycolic acid of high viscosity containing 0.3 glycolic acid groups per glucose unit may be soluble only in cold 10 per cent alkali whereas a very low viscosity product of the same degree of substitution may be soluble in very weak alkali at room temperature. Accordingly, the degree of substitution is regulated to fit the nature of the cellulose used or vice versa, the degree of degradation of the cellulose is controlled so that with a given degree of substitution a product which dissolves only in dilute alkali upon chilling is obtained.

These new derivatives are superior to the previously described cellulose glycolic acids soluble in dilute alkalies at room temperatures in that they are less hygroscopic and less sensitive to water in general. Transparent sheets made from them have a higher wet strength and may, therefore, be handled more easily during manufacture and are less susceptible to damage in such processes as the finished goods must undergo. These films are superior to regenerated cellulose in having a greater flexibility and softness, and moreover they have a marked affinity both for basic and for direct dyestuffs.

According to the process described in this application there is obtained a regenerated cellulosic body which may be purified by simply washing with water or, at most, bleaching and washing with water. Such products, therefore, have advantages over materials obtained from viscose and the like which must be subjected to expensive and deleterious purification treatments for the purpose of removing undesirable impurities, for example sulfur bodies. The products obtained according to this invention are sulfur-free.

This application contains matter divided out of application Ser. No. 682,119 filed July 25, 1933, issued November 10, 1936, as Patent No. 2,060,056.

As many apparently widely different embodiments of this invention may be made without departing from the spirit and scope thereof, it is to be understood that the invention is not limited to the specific embodiments thereof except as defined in the appended claims.

What is claimed is:

1. A regenerated cellulosic derivative of improved moisture resistance produced by dissolving in dilute aqueous caustic soda, a low-substituted cellulose glycolic acid which is substantially insoluble in 6% aqueous caustic soda solution at room temperature but soluble in said caustic soda solution near the freezing point thereof, and thereafter regenerating the cellulosic body.

2. A regenerated cellulosic product of improved moisture resistance produced by dissolving in dilute aqueous caustic soda, a low-substituted cellulose glycolic acid which is substantially insoluble in 6% aqueous caustic soda solution at room temperature but soluble in said caustic soda solution near the freezing point thereof, and regenerating the cellulosic material in shaped form.

3. A regenerated cellulosic product of improved moisture resistance produced by dissolving in dilute aqueous caustic soda, a low-substituted cellulose glycolic acid undissolved by 6% aqueous caustic soda solution at room temperature but dissolved therein at temperatures near the freezing point, and extruding the solution through an orifice and regenerating the cellulose glycolic acid in continuous form as it leaves the orifice.

4. A regenerated cellulosic product of improved moisture resistance produced by dissolving in dilute aqueous caustic soda, a low-substituted cellulose glycolic acid, which is substantially insoluble in 6% aqueous caustic soda solution at room temperature but soluble in said caustic soda solution near the freezing point thereof, and forcing the solution through a narrow slit into a regenerating bath.

5. A regenerated cellulosic product of improved moisture resistance produced by dissolving in dilute aqueous caustic soda, a slow-substituted cellulose glycolic acid which is substantially insoluble in 6% aqueous caustic soda solution at room temperature but soluble in said caustic soda solution near the freezing point thereof, and forcing the solution through a spinneret into a regenerating bath.

JOSEPH F. HASKINS,
*Administrator of Deane C. Ellsworth, Deceased.*

CERTIFICATE OF CORRECTION.

Patent No. 2,190,445.  February 13, 1940.

JOSEPH F. HASKINS, ADMINISTRATOR
of DEANE C. ELLSWORTH, deceased.

It is hereby certified that error appears in the printed specification of the above numbered patent requiring correction as follows: Page 2, first column, line 32, for "tmperature" read temperature; and second column, line 6, for "-.CH$_2$COOH" read -O.CH$_2$COOH; line 11, for "compositon" read composition; page 4, first column, line 74, for "glycol" read glycolic; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.